INVENTORS
Wallace H. Coulter
BY Abraham Siegelman
ATTYS.

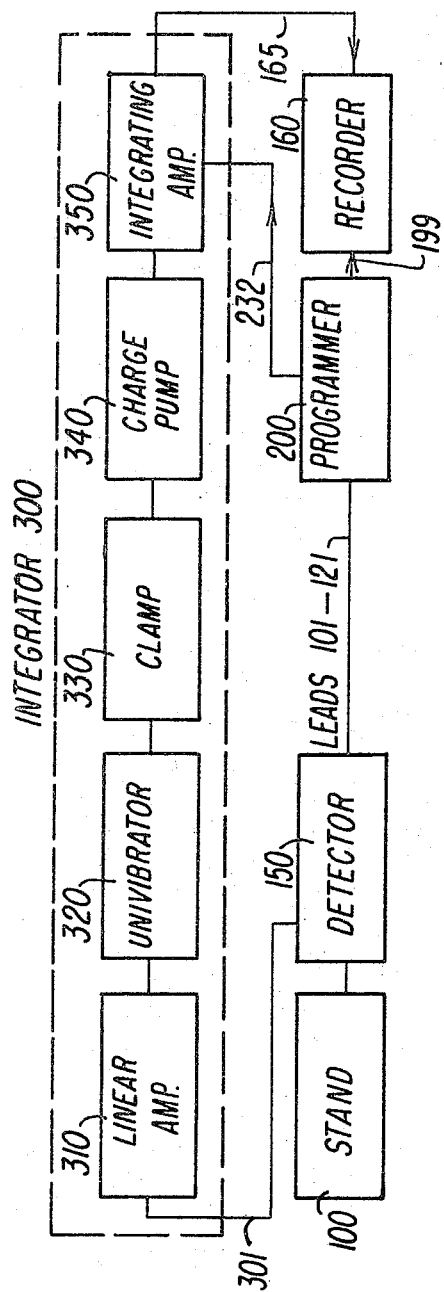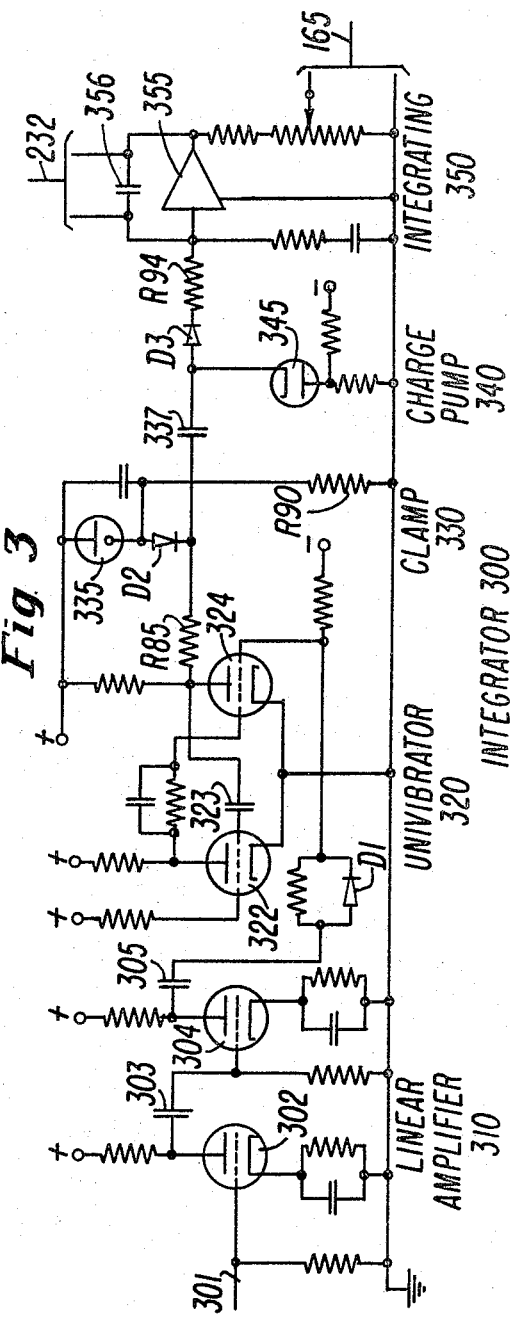

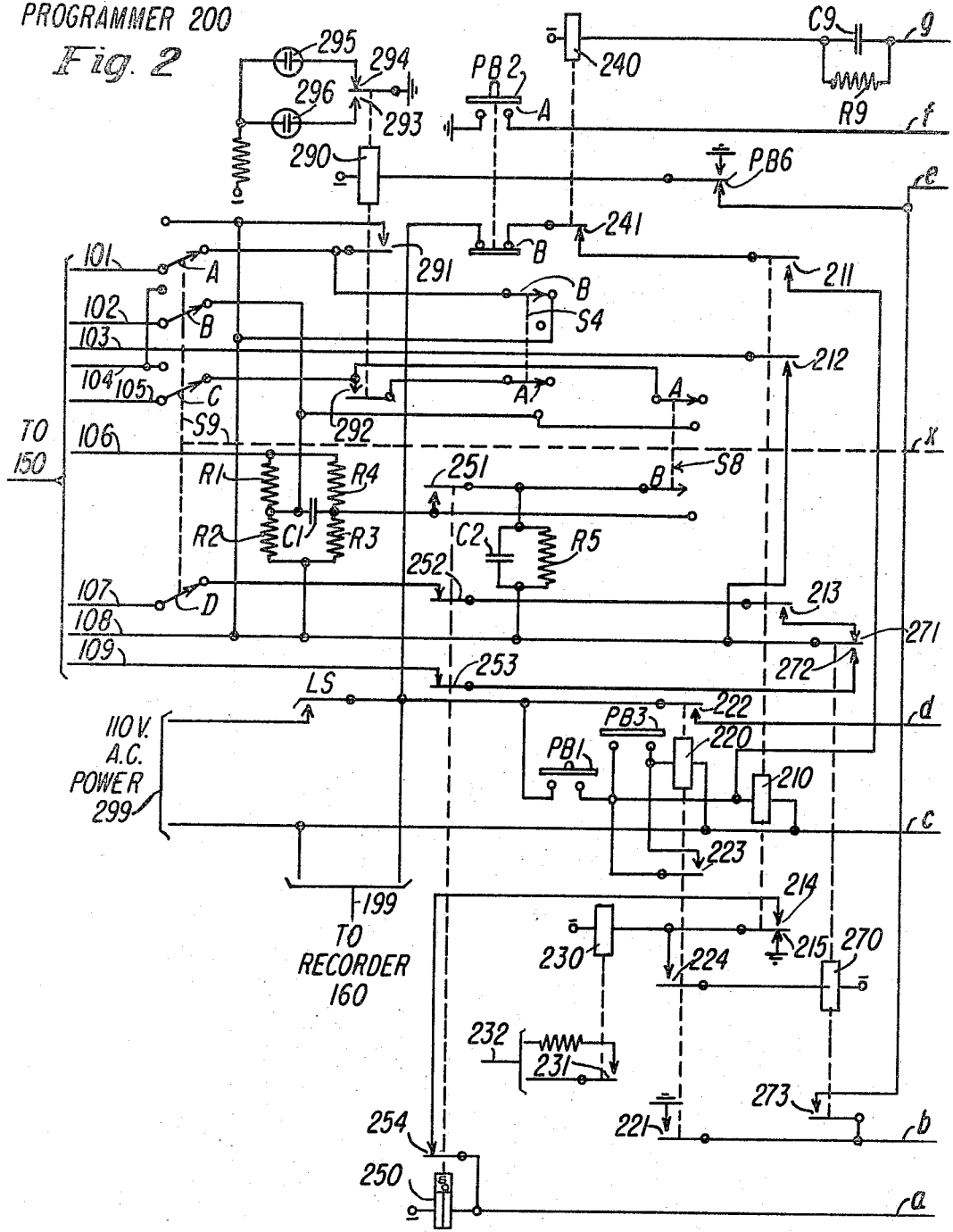

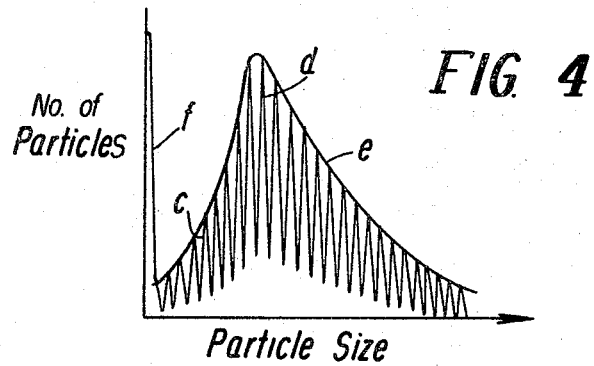
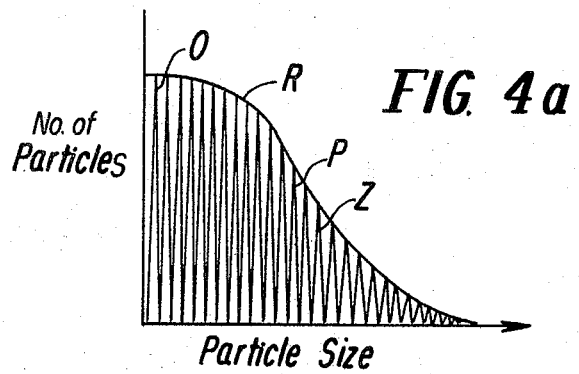

3,331,950
PARTICLE DISTRIBUTION PLOTTING
APPARATUS
Wallace H. Coulter, Chicago, and Abraham Siegelman,
Morton Grove, Ill., assignors to Coulter Electronics,
Inc., Hialeah, Fla., a corporation of Illinois
Continuation of application Ser. No. 92,006, Feb.
27, 1961. This application July 11, 1966, Ser. No.
564,429
25 Claims. (Cl. 235—92)

This application is a continuation of our co-pending application Ser. No. 92,006, filed Feb. 27, 1961, now abandoned.

This invention relates generally to the art of detecting and sizing particles of minute dimensions maintained in suspension in some carrier fluid, and more particularly, is concerned with the provision of apparatus which will plot automatically, on a suitable chart, for instance, certain information relative to the distribution of sizes and quantities of particles in the suspension under study.

The techniques of counting and sizing particles are utilized in great and diversified scope in many sciences and industries. There are many different devices and equipment which are utilized for such purposes, from the various optical devices which are operated manually and tediously to the complex and sophisticated machines which operate electronically. Considerable advance in the field has been achieved by apparatus constructed in accordance with U.S. Patent 2,656,508, and an improved apparatus constructed in accordance with U.S. Patent 3,259,842; both foresaid patents being owned by the assignee of this application.

In said patented apparatus, the particles are caused to pass through a microscopic or macroscopic aperture so as to vary the conductance of the volume of carrier or suspension fluid contained along the length of the aperture. Means are provided to detect such changes and thereby provide electrical signals, each representing a particle, and the amplitude of the signal for any particle being substantially proportional to the size of the particle. The earlier apparatus was provided with counting means energized by the signals. An intervening threshold circuit enabled the operator to limit the signals reaching the counting apparatus to those which had amplitudes only greater than the threshold. The threshold amplitude could be varied, so that this apparatus could be used for sizing particles as well as counting them.

The improved apparatus described and claimed in said co-pending application has many changes in the circuitry, although it operates on substantially the same principles. In addition, in its circuitry, there is included a pair of threshold circuits, each of which may be adjusted to provide an independent threshold value. The signals provided by detecting the passage of particles through the aperture are screened by the two threshold circuits whereby only those signals will pass through that are of an amplitude lying between the levels established by the two thresholds. In effect, therefore, the threshold circuits provide a "window," the upper and lower limits of which are adjustable, so that only particles of a given size range are counted for any given window. If desired, the upper threshold limit circuit can be completely disconnected to enable particle counts for all sizes above the lower threshold limits.

It will be appreciated from the information given above that using the second mentioned structure, it is possible to obtain data which will enable the plotting on charts of the distribution of various particle characteristics for any given suspension, but notwithstanding the vast improvement over all previously known apparatus, when using the aforementioned apparatus, is required to be done slowly and manually from the information given. For each reading it is required to adjust the threshold circuits to the new window limits, and this is required to be done manually. Although a considerable time saving occurs over that previously necessary to secure such charts, the time interval is still such as to discourage the making of such charts or graphs as a routine matter.

The invention herein is concerned with apparatus that can be connected with the structures of the above described patent and application or other particle detection apparatus, such as optical detectors, for the purpose of providing automatic plotting. It provides such rapid and facile plotting of the relative distribution of particle characteristics as to enable the making of graphs illustrating the same as a matter of routine in the operation of the particle detecting apparatus.

The apparatus of this invention achieves several unique functions which may be enumerated as follows:

(a) The apparatus can be adjusted to plot a graph which gives the relative distribution of particles of different sizes in a given suspension.

(b) The apparatus can be adjusted to plot a graph of the total number of particles of a given size in a suspension between any two limits defined by a window.

(c) The apparatus can be adjusted to plot a graph which gives the relative distribution of particles of certain selcted sizes.

(d) The apparatus can also be used to indicate particle flow rates.

In essence, the present invention incorporates a programmer and an integrator for enabling the output signals of particle detection apparatus, such as disclosed in the forementioned U.S. Patent 3,259,842 selectively to control the counting of particles of various sizes and plotting this information on chart paper.

As mentioned generally above, the invention described in U.S. Patent 3,259,842 is provided with means to produce a window of variable upper and lower limits to control the size range of the signals passed to the counting apparatus. The window is produced by means of two threshold circuits each establishing a potential level by means of suitable biasing potentials controlled by potentiometers. The circuit constants are chosen to enable the full dynamic range of the particles being studied to be achieved, so that said limits of the window can be varied selectively in increments along the entire range in order to give as fine or as coarse a determination of size distribution as desired. Obviously, any particle size can be chosen and only that information used, if desired. Suitable calibration of the thresholds by dials or scales traversed by the potentiometer pointers is achieved readily.

It is important in many fields to know the relative distribution of particle sizes in a test sample. Formerly this required the successive manual adjustment of the threshold potentiometers so that the operator could obtain a count of the particles in each size range or grouping. The manual adjustment was subject to both error and considerable time delay and since the particle range may change in certain fluids such as blood with the passage of time, the readings did not always reflect the actual condition of a fresh fluid sample.

In addition to the above, time was required for the tabulation and working out of the plot or graph of the results. Another factor responsible for error readily creeping into such determinations was the need for an accurate timing interval for each trial.

It is one of the primary objects of this invention to provide means for eliminating the disadvantages attendant upon the use of said apparatus by manual methods which comprises programming structure which can be adjusted automatically to plot information concerning the size distribution of particles of a given sample suspension.

Further objects of the invention are the provision of means enabling the automatic selection of the timing interval during which each size range of particles is being scanned; the provision of means for selecting automatically only predetermined size ranges of particles to be plotted; the provision of means for selecting automatically starting and stopping ranges for the plotting of a given distribution curve; the provision of apparatus to register the total number of particles in any desired size ranges.

Further objects of the invention are concerned with the provision of novel switching and circuit apparatus to accomplish the general functions desired of the apparatus including, means for integrating the pulses passed in any given interval in order to provide a value representative of the said number for plotting purposes, and means of performing this function successively for a group of determinations, and the like.

The foregoing and other objects of the invention will become apparent as the description thereof evolves in connection with which, a preferred embodiment of the invention has been described in detail and illustrated in the accompanying drawings. It is contemplated that minor variations in the size, arrangement, proportion and construction of the parts thereof may occur to the skilled artisan without departing from the scope or sacrificing any of the advantages of the invention.

In the drawings:

FIG. 1 is a block diagram of apparatus for automatically plotting particle data which is constructed in accordance with the invention, the same being shown associated with particle detecting and counting apparatus for controlling the operation thereof for the purposes of the invention.

FIGS. 2 and 2a are circuit diagrams, illustrating the details of the programmer shown in FIG. 1.

FIG. 3 is a circuit diagram of the integrator of FIG. 1; and

FIGS. 4 and 4a illustrate respective types of characteristic graphs provided by the apparatus.

Figure 2A:
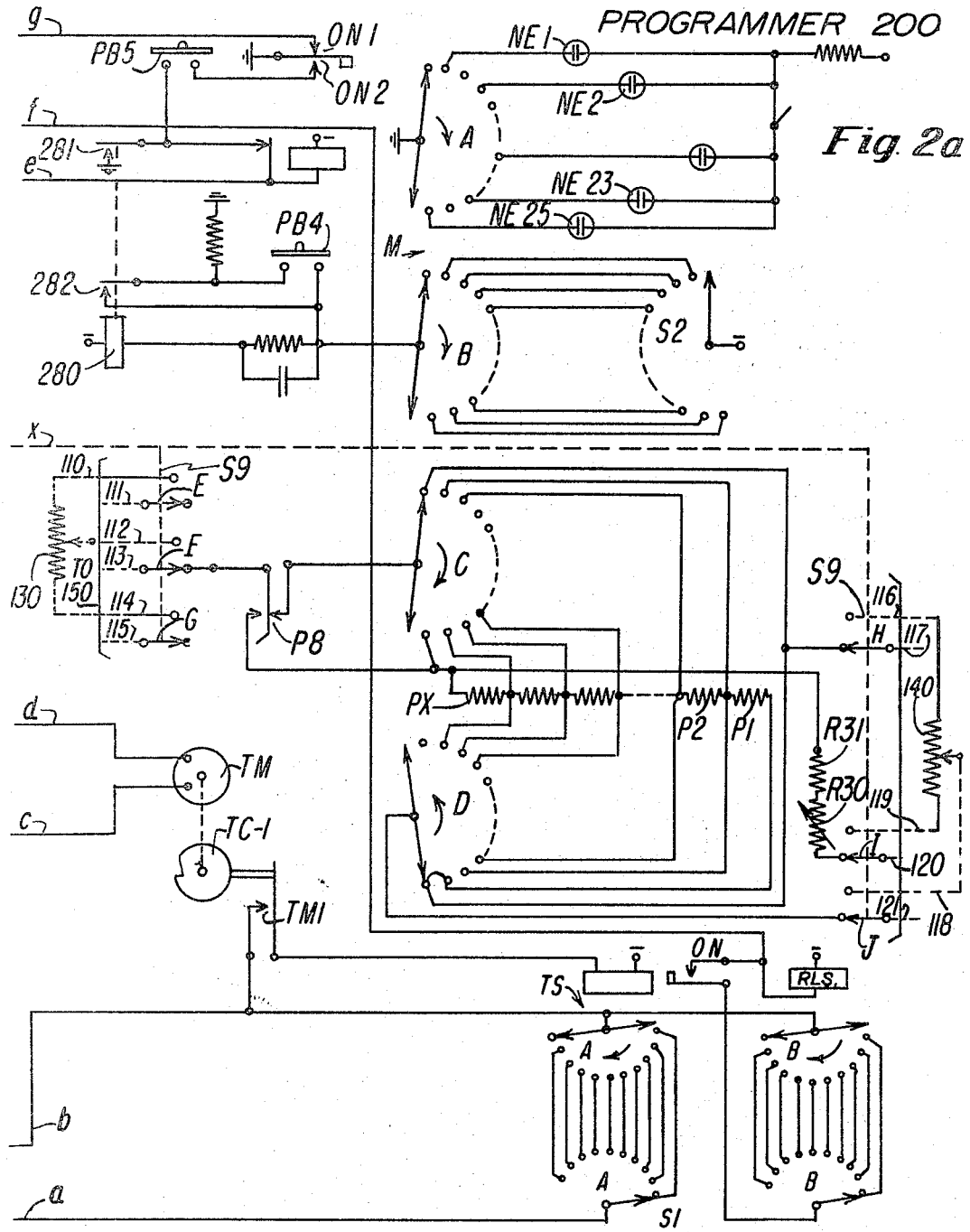

Referring now to FIG. 1, there is illustrated a block designated 100 representing the detecting orifice apparatus; a block designated 150 representing the apparatus for controlling particle detection and counting; a number of blocks respectively designated 310, 320, 330, 340 and 350 within the broken line 300 and representing apparatus for integrating the number of detected particles; a block designated 160 representing any well known type of graph plotting apparatus; and a block designated 200 representing programming apparatus for automatically and selectively controlling the functions and operations of the apparatus in the other blocks.

The detecting orifice apparatus 100 is known as a "stand" usually comprises a pair of vessels, one having an aperture submerged in a test fluid contained in the other vessel and means for drawing the fluid through the aperture as described, for example, in the aforementioned patents. The fluid is a suspension of particles of various sizes which are to be detected for counting and/or sizing, and concerning which information it is desired to plot graphs.

The apparatus 150 for controlling particle detection and counting includes means described in the aforementioned patent application for providing an electrical current through the orifice and structure for exercising other control functions such as initiating the passage of a predetermined volume of fluid through the orifice. This apparatus may be termed the detector although many additional functions are, or can be performed thereby.

The detector apparatus 150 includes circuitry for rejecting pulses occurring as a result of passage of particles which do not fall within the limits defined by the window above referred to. It also permits the passage of those pulses which fall within the limits defined by said window to a counter device all as described in the aforementioned U.S. Patent 3,259,842. The counter device may comprise any well known type of counting or registering arrangement for sequentially registering such pulses such as, for example, glow counter tubes of the decade type which indicate the count in successive tubes by the position of a glow at respective electrodes.

Each particle which passes through the aperture of the stand 100 will vary the impedance to the flow of current through the aperture and suitable electrodes for instance, in the fluid on opposite sides of the aperture can detect this change in impedance and produce a signal, the amplitude of which is related to the size of the particle. Thus, the number of particles which pass through the aperture will correspond to the number of pulses produced, and the amplitudes of these pulses will vary in accordance with the size of the respective particles. These phenomena enable the counting and sizing to be achieved. The detector apparatus 150 has a pair of threshold circuits each of which is controlled by a potentiometer whose purpose it is to define the limits of the window through which the desired sizes of pulses only are applied to the counter apparatus. The potentiometers are shown in FIG. 2a at 130 and 140. These limits may be varied as desired by adjusting said potentiometers to pass pulses within either narrower or larger size ranges or in successive steps. The latter problem often creates considerable difficulties since the potentiometers for setting the upper and lower limits successively must be adjusted if particles within successive limits are to be counted and since over a period of time the sample may change character so that the particles therein may vary either from the standpoint of size or number. Thus, this creates one of a number of problems which may provide counts not in accordance with the original conditions of the sample.

The integrating apparatus 300 comprises a linear amplifier represented by block 310 which serves primarily to amplify any pulses received by way of lead 301; a pulse shaping univibrator 320 which delivers one pulse for each received pulse to a charge pump represented by block 340. A clamp 330 serves to limit the excursion of this pulse to a predetermined value so that the charge pump 340 receives the same charge for each pulse. The charge pump 340 feeds an integrating amplifier, indicated by block 350, which integrates the received pulses to control a recorder indicated by the block 160 connected by cable 165 to amplifier 350. The integrating amplifier may be of any well known commercially available type.

The recorder 160 may be of known construction comprising a motor for driving a strip of chart or graph paper and an arm or stylus having a recording pen, for example. The recording pen may move along the ordinate or Y axis of the graph paper a distance corresponding to the amplitude of a signal applied thereto by the integrating amplifier 350, as the chart or graph paper is moved by the drive motor. The plot provided by the pen therefore traverses an area of the paper corresponding to the total particle count in any particular time interval over which measured. The maximum recorded movement of the pen at the recorder 160 along one axis therefore records the maximum number of received pulses within the particular time interval that the amplifier 350 is integrating and therefore for a respective size range. If a series of such records are made as indicated at $c$ and $d$, for example in FIG. 4, the maximum recorded position of each provides an indication of the relative distribution of particles of different sizes. Thus in FIG. 4 a series of movements of the pen along the Y axis are illustrated. These represent plots of the number of particles in respective size ranges, while the envelope curve $e$ fashioned by joining the respective apexes provides an indication of the relative distribution of the partcle numbers in the respective size groups.

The programmer apparatus 200 is connected by means of leads 101–121 to the detector 150 for the purpose of permitting the detection and counting sequence for particles passing through the aperture at stand 100 selectively and automatically to be controlled. The connecting cable 232 to the integrator 300 permits control of the integrating amplifier in synchronism with the detector 150. The line 301 connecting the integrator 300 to the detector 150 transmits a pulse to the linear amplifier 310 each time a pulse lying within the threshold limits or window is detected. For each pulse transmitted to the amplifier 310 a pulse is also applied to the decade glow counter tubes 295 and 296 shown in FIG. 2 so that they may provide simultaneously a count of the pulses passed through the window.

Referring to FIG. 2, the programmer 200 includes a switch S9 by means of which suitable ones of the leads 101–121 are chosen to achieve the desired control. Thus, the potentiometers 130 and 140 are disconnected from their various potential supply leads and output leads and instead the resistors P1–Px are connected in their place to control the threshold or window limits. In addition, the stop and start control and various reset leads controlled by switch S9 are arranged to be connected to potentials supplied from the detector 150 for the purpose of insuring that the same potential values are available throughout the system where needed. Further, the programmer has its own 110 volt supply indicated at 299 and various rectified potentials are supplied therefrom for operating certain relays and stepping switches at the programmer.

The programmer 200 has a timing motor TM which serves to provide a signal representative of a predetermined time interval and a switch TS for counting those intervals. The time selection switch S1 permits selection of a desired number of those intervals during which particles of a particular size can be counted and a graph thereof plotted.

The switch M provides an arrangement for successively selecting resistors P1–Px to set the lower and upper threshold limits of different windows at respective values so that the number of particles passed by each window may be gauged. Switch M at its level A also provides an indication as to which of the windows or particle size ranges is being gauged. Switch S2 permits a selection to be made as to the particle size group or window at which the graphing or counting is initiated.

The programmer 200, in addition, has a switch PB2 for stopping all functions; a start switch PB1 which initiates operation of the programmer and a record switch PB3 by means of which its recording functions are initiated. The programmer also has the switch S4 which permits the count registered at the glow counter tubes to be retained for a desired interval while the graphing or recording operation continues so that the operator or attendant may know the precise count which has been registered for a particular graph. It will be understood of course that once the apparatus is calibrated and the graph paper marked accordingly, the count may also be simply read off the paper. The switch PB6 permits the number of particles in either odd or even numbered windows or particle size ranges to be counted by the counter tubes when switch S4 is operated from the position shown in FIG. 2 to an alternate position. The switch S8 permits resetting of the glow counter tubes.

In brief, the programmer switch S9 is operated when it is desired to have the programmer 200 control the apparatus for enabling the recorder 160 to plot a graph of particles passing through one or more of the windows. The start and record push buttons PB1 and PB3 respectively are then successively pressed to initiate the operation of the programmer 200. These push buttons are momentarily depressed for causing the energization of the relays 210 and 220 in succession through suitable connections which are readily seen in the diagram of FIG. 2.

The relay 220 closes contacts which provides a connection for the timing motor TM by way of the connecting leads $d$ and $c$ to the power source 299. Rotation of the timing motor TM and its coupled cam TC–1 closes the cam contact switch TM1 at timed intervals, for example in the structure illustrated, every four seconds. The closing of the contacts TM1 energizes the relay driving the stepping switch TS, causing the arm thereof to be stepped to the next position relative to that which it had before energization. The position of the arm of switch S1 will determine when the wipers of the stepping switch TS are released to return to their initial position.

Switch M is operated simultaneously with the release of the switch TS and it will select the threshold limits of window within which the pulses from the detector 150 are to be counted and plotted. As previously mentioned, the count of the particles is registered on the counting indicator coupled to the detector structure 150 and at the same time pulses corresponding to the particles are passed to the integrator 300 to control the recorder.

The switch S1 may be set manually to any one of a number of positions for selecting the scanning time period for each window. Switch TS is stepped once for each four-second interval until it reaches the position selected by S1. When the wiper arm of TS has advanced to the position chosen by the switch setting of S1, the switch M is stepped. In effect, therefore, each window will be scanned for a time interval from 4 to 40 seconds, in four-second increments, as determined by the setting of S1.

Operation of the recorder 160 for plotting or graphing the relative distribution of particles in different size ranges is initiated under control of the programmer 200 by moving switch S9 to the position thereof shown in FIGS. 2 and 2a. Switch S9 is a gang switch having levels A–J, the levels A–D of which are shown in FIG. 2 and levels E–J are shown in FIG. 2a. This ganged connection is indicated by the broken line $x$. Movement of switch S9 to the illustrated position thereof disconnects the stand 100 from control of detector 150 and places both the stand 100 and detector 150 under control of the programmer 200. The potentiometers 130 and 140 for establishing the lower and upper levels of the windows are now disconnected at levels E–J of switch S9 and the respective resistors P1–Px are connected in their place. The dotted connections from various levels of switch S9 are provided merely to indicate specific apparatus such as potentiometers 130 and 140 and various sources of potential are at the detector 150. These are illustrated primarily to enable easier visualization of the manner in which the programmer 200 is interconnected with the detector 150 so as to exercise various controls, which are ordinarily exercised by the detector. It will also be understood that certain auxiliary functions performed at the programmer 200, which are not necessary to the understanding of the functioning of the programmer and detector 150 have been eliminated to avoid an unnecessarily lengthy and complex description.

Switch LS is closed to supply power from the 110 volt source 299 by way of the cable 199 to the motor (not shown) of the recorder 160 which initiates movement of the record paper. Switches S1 and S2 are manually set to a desired position as previously explained. Switch S1 is operative to select the desired timing interval during which the respective windows are scanned. Switch S2 is operative to enable switch M to select any initial, or starting, window among the group following the momentary operation of switch PB5. This sequence will be subsequently described.

The start switch or button PB1 is operative to connect the AC relay 210 across the power supply 299. Relay 210 energizes and locks operated over contacts 211 and 241 and through the contacts B of the manual stop switch PB2. The contacts of the start button PB1 are now shunted so that its release on removal of the operating pressure thereon does not affect relay 210. Relay 210 removes ground from normally operated relay 230 at contacts 215 and that relay restores to open contacts 231. With contacts 231 open, the short extended by means of cable 232 to the integrating capacitor 356 in the integrator 300 is removed and the amplifier 350 now functions to integrate the total number of pulses detected as a result of detectable particles passing through the orifice in the stand 100. It will be understood, however, that pulses may be blocked from the integrator 300 in any well known manner until the switch TS is sent through one time cycle or the graph resulting from particles received before switch TS completes one cycle, may be ignored. Either of these latter procedures is available for the reason that the first window or threshold limits are not determined, until switch TS completes one cycle. At contacts 214, relay 210 prepares a circuit to relays 230, 250 and 270 in shunt from the level A wiper of the time selection switch S1. At contacts 212 a circuit is completed by relay 210 for applying the potential on lead 108 to lead 103 for initiating current flow through the detecting orifice or aperture at stand 100. At contacts 213 relay 210 connects the potential on lead 108 through contacts 271 and 252 to lead 107 to initiate particle detection at detector 150. These contacts 213 are thus similar to the metering contacts such as utilized in connection with certain apparatus associated with the orifice and which responds to the passage of fluid through the orifice to permit particle detection. Other contacts such as 212 or 213 may also be closed either during or after operation of button PB1 to initiate operation of the valve or pump (not shown) for drawing fluid through the orifice at stand 100; however, this may also be accomplished over leads 103 or 107 in any well known manner.

The operator now operates the record button PB3 to complete a circuit by way of leads c and d for energizing the A.C. relay 220 from the 110 volt supply through contacts 211, 241 and the B contacts of the stop button PB2. Relay 220 shunts the contacts of record button PB3 at contacts 223 and locks operated over the contacts 211 and 241. At contacts 224 it prepares another point in a circuit to relay 270 and at contacts 222 energizes the timing motor TM from the 110 volt supply 299. The motor TM operates the cam TC1 to close contacts TM1 at four-second intervals. At contacts 221 ground is applied by way of lead b to one spring of both contacts TM1 and 273 and also to the level A and B wipers of the time count or step switch TS.

The timing motor TM closes contacts TM1, after a four-second interval, to forward ground from contacts 211, past contacts TM1 to the stepping magnet of switch TS. This switch is arranged with a direct drive so that the magnet steps its associated wipers on energization. The wipers of levels A and B of switch TS therefore move to their first bank contact or position. This connects ground on lead b to the first bank contact on each of the levels A and B of switch TS. Since these bank contacts are connected to respective bank contacts of levels A and B of switch S1, ground is extended to the first bank contact of levels A and B of switch S1 if switch S1 is set to its first position.

At this point it will be noted that the window selection switch M is in its home position. In this position its level C and D wipers are both connected to the level H wiper of switch S9 and are therefore at the reference potential supplied by means of lead 117 from the detector 150. The level D wiper extends this potential over level J of switch S9 and lead 121 to control the lower threshold limit, while the level C wiper now extends the same potential past the switch P8 to control the upper threshold limit by means of level F of switch S9 and lead 113. The threshold limits at this position may be balanced by the adjustment of suitable resistors which are not shown. It will be noted that although the level D wiper of switch M is denoted as moving in a direction opposite that of the other wipers. This is done only to enable the various connections between the bank contacts and resistors P1–Px to be simplified, it being understood that all of the wipers of switch M normally move in the same direction.

The reference potential at the level H wiper of switch S9 is also connected through resistors P1–Px. Resistor Px is connected by means of resistors R31 and R30 to another reference potential supplied from the detector 150 to lead 120 and level I of switch S9, and therefore a voltage drop is provided across each of the respective resistors, P1–Px. Switch M is arranged to sequentially connect the respective wipers C and D to alternate ends of successive resistors P1–Px, as the switch is stepped through successive positions. Each of the wipers will therefore supply respective threshold limit potentials to the detector 150 for setting the respective upper and lower thresholds in contiguous steps as switch M is stepped through its successive positions.

The height of the window is determined by the potential difference between the upper and lower threshold limits or potentials and these depend on the voltage drop across the respective resistors P1–Px. Resistors P1–Px can therefore be arranged to provide either equal or differing voltage drops depending on desired window heights or differences between threshold limits. Thus both successive and equal contiguous ranges of particle size are enabled to be detected at the detector 150. Resistor R30 is normally adjusted to set the maximum upper threshold limit when switch M is in its last position at a value corresponding to the maximum upper threshold limit normally supplied by adjustment of the potentiometer 130 at the detector 150. Thus with both the minimum lower and maximum upper threshold limits set at respective values corresponding to those supplied by adjustment of potentiometers 140 and 130 respectively, the resistors P1–Px supply respective upper and lower threshold limits lying within the range provided by the detector 150.

If switch S1 had been set to its first back contact indicating that a four-second interval is chosen for scanning each window, the ground extended to the first bank contact from the level A wiper of switch TS is forwarded from the level A wiper of switch S1 and lead A, past contacts 254, 214 and 224 to energize relays 250, 230 and 270. Relay 230 is energized directly from contacts 214 and relay 250, of course, energizes directly from the ground at the level A wiper of switch S1. Relay 250 is slow to operate and slow to release and after it operates, it opens the operating circuits for relays 230 and 270 at contacts 254; however, those relays have already energized at that time.

Relay 230 at contacts 231 shorts the integrating capacitor 356 by means of cable 232 so that it is reset to its initial condition. The pen or stylus of the recorder therefore starts to return to its zero line as the output of the amplifier 350 returns to zero volts. Relay 270 extends the potential from lead 108, past contacts 253 to provide a stop bias by way of lead 109 to the detector 150. This now terminates operation of the detector 150 in much the same manner as done with stop contacts described in previous particle counters so that the number of particles may be related to a desired volume of fluid flow through an orifice. Thus by starting and stopping the detector 150 at predetermined time intervals during which the fluid is drawn through the aperture or orifice at stand 100 at a predetermined rate the number of particles is gauged against a particular or desired volume of fluid. At contacts 271, relay 270 disconnects lead 108 from 107 to remove the start bias. At contacts 273 relay 270 extends ground from contacts 221 by way of lead e for energizing the motor magnet of switch M and the relay 290.

Relay 290 is a two step or ratchet relay of any well known type whose contacts change position on each energization of the coil and hold that position after the coil is deenergized. At contacts 293 and 294 it can light either lamps 295 or 296 and thereby signal its respective condition which will now be assumed to be as shown.

The level B wiper of switch TS in the meantime extends the ground from contacts 221, past the level B wiper of switch S1 and the off normal springs ON of switch TS to energize the release magnet RLS of switch TS. Magnet RLS now sends the wipers of switch TS to their home position to open the off normal spring ON. The operate period of magnet RLS may of course be controlled in any one of a number of well known manners to insure that the wipers reach home, but which form no part of the present invention and are therefore not shown or discussed.

At contacts 252 and 253 relay 250 opens both the start and stop circuits extending over leads 107 and 109 respectively. At contacts 251 relay 250 connects the capacitor C2 to the capacitor C1. Capacitor C1 is normally charged to a high positive value through the bridge circuit comprising resistors R1, R2, R3 and R4 connected between a positive potential on lead 106 and the potential on lead 108. Capacitor C2 on the other hand is at a value substantially corresponding to the potential on lead 108 as it is charged through resistor R5. When it is connected to capacitor C1 responsive to the closure of contacts 251, capacitor C1 transmits a momentary negative reset pulse to lead 102, as it swings toward the potential of capacitor C2. The reset pulse on lead 102 enables the cycle for drawing fluid through the aperture at stand 100 to be repeated. At contacts 254 the circuits to relays 230 and 270 are restored.

When relay 270 is restored, the circuit to the magnet of switch M is opened. The magnet is de-energized to step the wipers of levels A, B, C and D to their next contact. At contacts 271 the start circuit over lead 107 is again prepared and at contacts 272 the stop circuit over lead 109 opened at another point. Relay 230 opens the integrating capacitor 356 short at contacts 231. As the wipers of switch TS step toward home, the circuit to relay 250 is opened, and it restores, after a period of time so that the start bias for detector 150 is now reapplied over contacts 252. At contacts 251 capacitor C2 is disconnected from capacitor C1 and the charge on each returns to its original value.

The coil of relay 290 de-energizes on release of relay 270, but first it closes contacts 291 to apply the potential from lead 108 to the glow counter tube bias lead 101 for no purpose unless switch S4 is operated from the position in which it is shown. Switch S4 level B is normally maintaining a bias potential on lead 101 to the glow counter tubes. The bias permits the glow counter tubes to sequentially record or total the number of detected particles. At contacts 292 relay 290 prepares a reset circuit to the glow counter tubes over lead 105, but this remains incomplete, as switch S4 level A is unoperated. The contacts of relay 290 will now remain in the position to which they were operated, until the next energization of the relay 290, at which time the contacts are reversed.

The count provided at the glow counter tubes during the first step of switch TS and indicated by the graph line f in FIG. 4 may serve no purpose, as the threshold levels may be set so low as to permit micro or macro particles or background noise to be detected and recorded by the recorder 160.

It may be desirable to thereafter maintain or provide a record of the total number of particles passed through one or more windows in order to calibrate the graph paper, for example. The operator notes the return of the recording pen to the zero line during operation of relay 230. This return occurs as a result of the short on capacitor 356. He then momentarily operates the reset switch S8. Level B of the switch S8 serves the same purpose as contacts 251 by causing the transmission of a negative reset pulse over lead 102 as explained. The level A wiper of switch S8 connects the glow tube counter reset lead 105 from level C of switch S9 to the lead 102 and capacitor C1 so that it likewise receives a reset pulse. The pulse on lead 105 resets the glow counter tubes so that they may initiate the particle count from their zero positions.

In its first position, the level A wiper of switch M extends ground to the first neon tube NE1 for firing that tube. This indicates to the operator that the particles in a size range corresponding to the first window are now being plotted or graphed. At level B of switch M the relay 280 is connected to the first bank contact. This relay is controlled in accordance with the setting of switch S2 as will be explained.

It will be noted that the respective opposite ends of series connected resistors P1, P2–P$x$ are connected to corresponding ones of the bank contacts 1–25 of respective levels C and D of switch M. The opposite ends of the resistors therefore provide a voltage of different valve at the corresponding bank contacts of the two levels and that difference determines the height of the window between the lower and upper threshold limits. As the respective wipers are moved successively past their bank contacts, each will transmit the respective voltage thereat to the detector 150 for setting the respective threshold limits. As the upper and lower limits are moved by a fixed amount on each step of wipers C and D, the window or size range will be proportionately adjusted to permit particles from fine to coarse grades to be successively registered. Thus the wiper of level C applies the potential it derives to level F of switch S9 and lead 113 to set the upper threshold limit at the detector 150 at one limit of particle acceptance, while the level D wiper transmits its potential to level J of switch S9 to set the lower threshold limit of particle acceptance at the dectector 150 in successive contiguous steps as the wipers are moved past their bank contacts. It will be appreciated that the difference between the upper and lower threshold limits at each step depend on the chosen values for resistors P1–P$x$. If desired, therefore, the difference between the threshold limits at each step may be either equal or not as desired. Further, the respective threshold limits need not be contiguous, as by inserting resistors at desired positions between P1–P$x$, certain size ranges may be skipped or omitted.

With the upper and lower threshold levels now set by the resistance values connected to the wipers of levels C and D of switch M, the detector apparatus 150 responds to particles passing through the aperture at stand 100 that generate pulses whose characteristics are defined by these limits. The detector 150 provides a pulse individual to each successive particles and these pulses are fed in succession over line 301 to the linear amplifier 310 and also to the glow tube counters for advancing the count registered thereby.

Referring now to FIG. 3, it will be seen that the line 301 extends to the grid of amplifier tube 302 in the linear amplifier 310. With a positive pulse, representing a particle passing through the orifice at stand 100, appearing on line 301, the plate circuit of tube 302 swings negative and a corresponding negative pulse is transmitted through the capacitor 303 to the grid of tube 304. The plate circuit of tube 304 therefore swings positive and a positive pulse is transmitted through the capacitor 305 to the diode D1. The positive going portion of this pulse is transmitted through the diode D1 to the grid of tube 324 in the univibrator 320. Tube 322 of the univibrator is normally conducting due to the bias arrangement provided for the tube; however, when the grid of tube 324 swings positive, the plate circuit of that tube 324 swings negative and a corresponding negative pulse is transmitted through the capacitor 323 to the grid of tube 322 to cut that tube 322 off.

The clamp tube 335 is normally connected between the high potential supply for the plate circuit of normally nonconductive tube 324 and ground through the resistor R90. The clamp tube 335 is a gas tube having a constant voltage drop characteristic and is normally fired at about 85 volts so that it is conductive and the diode D2 reverse biased. The negative swing in the plate circuit of tube 324 is transmitted through the resistor R85 to charge capacitor 337. The diode D2 becomes unblocked when the plate circuit of tube 324 becomes sufficiently negative and diode D2 passes current through the tube 335. This limits the negative charge value on capacitor 337, thereby clamping this capacitor accordingly.

As capacitor 337 swings negative, the diode 345 begins to conduct and its cathode therefore swings slightly positive. After the termination of the univibrator pulse, capacitor 337, which has charged through diode 345, now discharges through diode D3 and the resistor R94 to the integrating amplifier 355.

The output of the amplifier 355 varies accordingly and is applied over the cable 165 for moving the recorder pen or stylus across the chart paper along the ordinate axis. Each successive input pulse from capacitor 337 causes the charge on integrating capacitor 356 to increase, as well as the output voltage of 355 so that the recording pen moves to a successively higher position along the y or ordinate axis of the graph paper with each successive pulse. Since the amplifier 355 is a high gain amplifier and the capacitor 356 is considerably larger than capacitor 337 the output voltage of amplifier 355 is retained between successive pulses.

As the diode D1 is blocked after the positive swing in the plate circuit of tube 304, the grid circuit of tube 324 returns towards its normal value and with the bias arrangement provided for tube 322, that tube 322 again initiates conduction. As the plate circuit of tube 322 swings negative, that swing is transmitted to the grid circuit of the tube 324 to cut that tube off. With the plate circuit of tube 324 swinging positive, the diode D2 is again blocked, and capacitor 337 returns to normal.

This train of events will be repeated with each succeeding pulse appearing on lead 301; however, on each succeeding pulse applied through the diode D3 the output of amplifier 355 is raised due to the fact that the amplifier 355 and the capacitor 356 have a large capacitative effect as compared to the capacitor 337. Thus each received pulse will progressively increase the output of amplifier 355 along a substantially linear curve provided by the characteristics of amplifier 355 and the recording pen will move accordingly. The capacitor 356 and the amplifier 355 therefore serve to integrate the received pulses, and the number of pulses received will be reflected by the output level of the amplifier 355. The line traced by the recording pen on the graph paper in its maximum position along the ordinate axis, reflects the total number of particles in a particular window or size range.

At the end of the particular scanning or time interval determined by the setting of switch S1, relay 230 is operated as explained to connect the leads of cable 232 from both sides of capacitor 356 together and the capacitor 356 returns to its initial condition. A succeeding plot or curve representative of the number of particles in the next window may thereafter be plotted by the recorder 160 after the recording pen returns to its initial or zero position responsive to the discharge of capacitor 356 for resetting the output of amplifier 350.

It will be recalled that the timing motor is closing contacts TM1 at four-second intervals. The switch TS may thus be stepped home after the first four-second interval if switch S1 is set on its first bank contact. Therefore, assuming switch S1 is on its first bank contact and that switch TS is stepped to its first position responsive to the closure of contacts TM1, that switch TS will thereafter be stepped home in the manner explained. The stop and start bias leads 107 and 109 together with the reset lead 102 are again controlled as explained.

Relay 270 operates as before explained to reoperate the motor magnet of switch M and that switch steps to its second position. In this position resistor P2 is now connected in the aforedescribed circuit to the threshold setting leads 113 and 121 so that additional increments are now added to both the lower and upper threshold limits of the window. This places the lower threshold at the level formerly provided for the upper threshold and the upper threshold at a new level above the lower level. The number of particles will again be registered by the glow counter tubes and added to the total registered previously. They will also be integrated by the integrator 300 to move the recording pen for plotting a curve representative of the number of particles between the two second threshold limits. Neon tube NE2 is now lighted as the M switch level A is in its second position. With the switches set, as described, this procedure for moving the recording arm and totalling the particles by registration at the glow counter tube is repeated for each of the 25 different threshold limits or windows to move the recording pen at recorder 160 along a different ordinate or Y axis for each window as shown in FIG. 4. The distance moved along ordinate Y axis corresponds of course to the number of particles present in the fluid sample of a size range corresponding to particular threshold levels and successively plotted along the X or time axis. Thus the switch M is stepped in the manner explained through each of its positions 1 to 25 for setting the different upper and lower threshold limits and a different graph provided for the particles lying within each different size range, as explained. The graphs may now be compared to secure information as to the distribution in the fluid sample of particles of different sizes as shown by the curve e in FIG. 4.

After a graph has been made corresponding to the number of particles detected within the size range set by the threshold levels provided by switch M in its 25th position the switch M is stepped to its home position. Thus the timing motor contacts TM1 close after switch M has been stepped to position 25 and they restore switch TS while relay 270 is operated and restored as explained. The motor magnet of switch M is also energized and de-energized as explained and it steps the wipers of switch M to their home position. The off normal springs ON1 close to ground lead g. This causes the capacitor C9 to transmit a momentary pulse for operating relay 240. Relay 240 opens contacts 241. The capacitor C9 returns to its original condition through the action of resistor R9 and relay 240 restores.

Contacts 241 on opening restore relays 210 and 220. Contacts 211 therefore open to terminate operation of the motor TM and no further operation of switch TS or M can thereafter occur, unless the operator again operates buttons PB1 and PB3 to repeat the cycle. It will be noted that the 25 different size ranges are registered in substantially 100 seconds with switch S1 set in its first position and that each time interval is an accurate duplicate of the others.

In the meantime the glow counter tubes are operated successively by each pulse generated by the particles to record a count corresponding to the total number of particles passing through the aperture at stand 100 and within the size range determined by the threshold limits.

In summary the buttons PB1 and PB3 are momentarily operated to energize relays 210 and 220 in succession. Relay 220 energizes the timing motor TM which operates to close the cam contact TM1 every four seconds. As soon as contacts TM1 close, switch TS is stepped to its first position and depending on the position of switch S1, switch TS is then released to its home position. Responsive to the release of switch TS, switch M is stepped to select the threshold or window limits within which lie particles of a particular size to be graphed and/or counted. The count is registered at the glow counter tubes at the detector and the integrator 300 controls the recorder 160 to provide a graph corresponding to the number of particles.

Switch S1 may be set to any one of ten positions, to control the number of steps taken by switch TS correspondingly before stepping switch M. Since switch TS is stepped once every four seconds, the time interval between steps of switch M may be controlled for a desired multiple of four seconds and therefore the length of time for scanning each window is set in accordance with the position of switch S1.

Operation of switch S4 controls counting by the glow counter tubes to enable them to total the number of particles in every other or alternate position of switch M and hold the count for a time interval. The time interval during which the number or count is held by the glow counter tubes is sufficient to permit the preceding size range to be recorded. The recorded number may be placed on the chart paper adjacent the particular graph. Thus operation of switch S4 from the position shown in FIG. 2 disconnects lead 101 from lead 108 at level B and places the glow counter tube bias lead 101 under control of contacts 291 of the ratchet relay 290. At level A of switch S4 the glow counter tube reset lead 105 is placed under control of contacts 292 of relay 290. Since the ratchet relay 290 holds contacts 291 and 292 either open or closed for successive steps of switch M, the contacts 292 will be closed on alternate steps of switch M. It will also be noted that relay 290 is operated coincidentally with the magnet of switch M so that contacts 291 and 292 close just before switch M takes the corresponding step. The reset pulse applied through capacitor C1 at the end of each step of switch M will be applied past level A of switch S4 and contacts 292 to reset the glow counter tubes to zero just before switch M takes the step during which contacts 292 are held closed. At the beginning of each alternate cycle or step during which contacts 291 are closed, the bias for the glow counter tubes is applied to lead 101 to enable the glow counter tubes to count or record the total number of particles during the corresponding step of switch M.

Therefore when switch S4 is operated, an initial reset pulse is applied to reset the glow counter tubes as soon as relay 290 closes its contacts 292 and since bias is then applied to the counter tubes at contacts 291, the counter tubes subsequently record the number of particles lying within the threshold limits next selected by switch M.

Since relay 270 subsequently operates relay 290 before relay 250 can close contacts 251 while switch M is in the next selected position, relay 290 opens contacts 291 and 292 before the reset pulse can be applied at lead 105. Switch M therefore takes a succeeding step to another position and relay 290 holds contacts 291 and 292 open during that step and while switch M is in the other position. The count is therefore retained by the glow counter tubes until the following operation of relay 290. Thus the glow counter tubes retain the recorded count for an interval corresponding to a complete scanning interval between steps of switch M. During this interval the operator may mark the count on the graph paper.

The operator may choose whether the counts retained by the counter tubes correspond to odd or even numbered windows. Thus by noting whether lamp 295 or 296 is lighted he knows the position of the contacts 291 and 292 for the even or odd windows. He simply operates switch PB6 momentarily, after S4, to operate relay 290 and change the sequence so that contacts 291 and 292 are closed in a sequence corresponding to either the odd or even numbered positions of switch M as noted by lamp NE1 etc. Recording the counts registered by the glow counter tubes on the graph paper along a respective line corresponding to the maximum position on the Y axis of the respective graphs permits the count for each subsequent graph to be read directly off the graph paper by comparison.

If the operator did not wish to include a certain count corresponding to a size range determined by for example the first window, he momentarily operates the switch S8. He may of course note the window or particle size range being graphed by observing which of the lamps NE1–NE25 are lighted. At level B of switch S8 a reset pulse is generated through capacitor C1 and extended through level A of switch S9 to lead 105 to reset the counter tubes and other apparatus as already explained. The operation will thereafter proceed as described.

If the operator decides that the graphing should begin at a particular size range, switch S2 is set at a position corresponding that that range. The operator also operates the pushbutton PB4 momentarily to apply ground to the relay 280 which locks operated through its contacts 282. At contacts 281, relay 280 applies grounds to the self-interrupting contacts of the motor magnet of switch M and the switch wipers are now stepped self-interuptedly, until its level B wiper is associated with the bank contact corresponding to that at which switch S2 has been set. At that time battery is extended from the wiper of switch S2 to the wiper of level B of switch M and relay 270 restores due to the shunting effect on the relay coil. It will be noted that switch M is thus stepped independently of switches TS and S1. Contacts 282 open as do contacts 281 on release of relay 280.

Opening of contacts 281 thereafter prevents self-interrupted stepping of the motor-magnet of switch M and the recorder 160 may then be controlled as already described. That is, to control the recorder, switches PB1 and PB3 are operated to step the timing switch TS and the switch M under control of the timing motor TM as explained.

If it is desired to stop the recording or graphing operation after any particular position is reached, the neon tube corresponding to that position is observed and when lighted, the stop button PB2 is momentarily operated. The stop button PB2 opens the holding circuit for relays 210 and 220 at level B so that both relays restore. Level A of button PB2 extends ground by way of lead $f$ to the release magnet RLS of switch TS and that switch steps home. At button PB5 the operator connects ground from the operated off normal springs ON2 to the motor magnet of switch M to step the switch home self-interruptedly. Off normal springs ON2 open in the home position of the switch M to open the homing circuit. Off normal springs ON1 close in the home position to pulse relay 240 and that relay restores relays 210 and 220. Since the timing motor TM is now de-energized, no further operations will occur.

In certain instances it may be desirable to graph or record particles above a certain size. Switch P8 shown in FIG. 2a is then operated from the position shown to disconnect wiper C from level F of switch S9 and connect one end of resistor Px to level F. The potential at the juncture of resistors Px and R31 will now be extended to the detector 150 to set the upper threshold limit at a maximum value regardless of the position of switch M. The lower threshold limit, however, will be progressively advanced as switch M moves through its respective positions. The result is to continually decrease the window width towards the upper limit as switch M is moved to its respective positions. Usually the total number of particles above a particular size will decrease as the lower limit is moved upwards and the graphs of the number of particles in the continually narrowing windows are illustrated in FIG. 4a. Thus in that FIG. 4a the graph of the first window is indicated at the 0 and will provide an indication of the total number of particles from the lower to the upper threshold limits. As the window is progressively narrowed the number of particles above a particular size determined by the respective lower thresholds decreases as shown at P and Z for example and the relative distribution of the particles above respective sizes indicated by the envelope curve R.

When it is desired to discontinue use of the programmer 200, switch S9 is switched from the position shown. This connects the counter bias lead 101 directly to lead 108 so that lead 101 is under control of the detector apparatus 150. At levels B and C of switch S9 the stop-start reset lead 102 and the glow counter reset lead 105 are placed under control of the detector 150. At level D the means for furnishing the start bias from the programmer 200 to lead 107 is disconnected so that the start bias may be furnished under control of the metering contacts at stand 100.

At level E of switch S9 one potential is connected to lead 110 extending to the detector 150 and the potentiometer 130 thereat. The level F of switch S9 connects the potentiometer arm over lead 112 to lead 113 for setting the upper level of one window or threshold limit and at level G of switch S9 the other end of the potentiometer 130 is connected over lead 115 to another potential. Similar connections are provided at levels H, I and J of switch S9 for the lower level of the window or threshold limit. Thus at level H, a particular potential is connected from lead 117 to lead 116 and the potentiometer 140 and at level I another potential is connected from lead 120 to lead 119 and the other side of the potentiometer 140. At level J the arm of potentiometer 140 is connected from lead 118 to lead 121 for setting the value of the lower threshold limit or window. The upper and lower threshold limits are therefore placed under control of the respective arms of potentiometers 130 and 140 and the size of the window set in accordance with the different adjustments between the arms of potentiometers 130 and 140.

At this time another aspect of the invention will be mentioned in that its concepts and broad objectives may be accomplished by utilizing means other than a stepping switch such as M. Thus instead of stepping the switch M at selected intervals, a motor (not shown) may be set in operation at the initiation of the plotting sequence. It may progressively operate a pair of rheostat arms, for example, in any well known manner to set the threshold limits progressively and without, for example, shorting capacitor 356. This will result in a continuous distribution curve of particle size, for example, as a function of the progressively changing limits. It is believed that the arrangement of such structure is obvious in view of the foregoing and that to illustrate the same would needlessly complicate the specification.

It is believed that this invention, its mode of construction and assembly, and many of its advantages should be readily understood from the foregoing without further description and it should also be manifest that while a preferred embodiment of the invention has been shown and described for illustrative purposes, the specific details are nevertheless capable as defined in the appended claims.

What is claimed and desired to be secured by Letters Patent of the United States is:

1. A particle distribution plotting apparatus comprising:
   particle detecting orifice means providing a signal for each detected particle, each signal having a parameter which is a function of the size of each respectively detected particle,
   particle detection control means coupled to said particle detecting orifice means and receiving each said signal, and said detection control means passing from an output thereof only signals representing particles within a predetermined size range,
   programming means coupled to said particle detection control means and regulating said size range,
   integrator means coupled to the output of said particle detection control means and receiving each of the signals passed therefrom, said integrator means producing an output which incrementally increases in magnitude proportional to the number of signals received thereby, and
   graphic recording means coupled to said programming means and being operationally controlled therefrom and also coupled to said integrator means and receiving and graphing the output therefrom.

2. Apparatus as defined in claim 1, wherein said integrator means comprises:
   a charge pump responsive to each of the signals received by said integrator means, and
   an integrating amplifier coupled to and progressively energized by said charge pump, the output of said integrating amplifier being the output of said integrator means which is coupled to said recorder.

3. Apparatus as defined in claim 2, wherein said integrator means further comprises:
   a linear amplifier, a univibrator, and a voltage clamp serially coupled between said particle detection control means and said charge pump, said voltage clamp limiting the response of the charge pump to each of said signals.

4. Apparatus as defined in claim 2 wherein, said charge pump and said integrating amplifier each comprises:
   a capacitor,
   the capacitor of said integrating amplifier being serially coupled to and having a storage capacity considerably larger than the capacitor of said charge pump.

5. Apparatus as defined in claim 4 wherein, said programming means comprises:
   relay means coupled across the capacitor of said integrating amplifier, said relay means being periodically energized and providing a discharge path for said capacitor and thereby resetting said integrator means.

6. Apparatus as defined in claim 1 wherein, said programming means comprises:
   means determining said size range to lie between a pair of predetermined limits.

7. Apparatus as defined in claim 6 wherein, said size range determining means comprises:
   electrically interconnected structure defining a plurality of pairs of predetermined limits corresponding to a plurality of different size ranges.

8. Apparatus as defined in claim 7 wherein, said programming means further comprises:
   selecting means coupled to said size range determining means and at any one time selecting a predetermined pair of said limits.

9. Apparatus as defined in claim 8 wherein said selecting means comprises:
   successively advanceable switching means.

10. Apparatus as defined in claim 9 wherein, said programming means further comprises:
    a first range control means coupled to said successively advanceable switching means and advancing it to a prescribed starting size range.

11. Apparatus as defined in claim 9 wherein, said programming means further comprises:
    a second range control means coupled to said successively advanceable switching means and stopping its advancing and resetting it to a home position subsequent to the selecting of a predetermined pair of limits.

12. Apparatus as defined in claim 7 wherein, said electrically interconnected structure comprises:
    impedance means having a plurality of spaced taps defining therebetween a plurality of impedance differences determinative of said plurality of pairs of predetermined limits.

13. Apparatus as defined in claim 12 wherein, said size range determining means comprises:
    multipositional switching means having first and second electrically ganged levels,
    each position within each level being connected to a different one of said taps,
    the similar positions of both levels simultaneously coupled to different taps defining any one of said pairs of limits, and
    said programming means further comprises selective energizing means coupled to said multipositional switching means for the positioning thereof.

14. Apparatus as defined in claim 13 wherein, said programming means further comprises:
limit fixing means selectively connectable to one of said levels and inhibiting the limit thereof from being changed by said selective energizing means.

15. Apparatus as defined in claim 13 wherein, said multipositional switching means further comprises:
a third ganged level,
each position of said third level having means indicating the positional status of said switching means and therefore the corresponding size range.

16. Apparatus as defined in claim 1 wherein, said programming means is coupled to said integrator means and comprises:
means automatically and successively selecting a plurality of size ranges,
means coupled to said graphic recording means initiating its operation upon selection of each of said size ranges and, via said integrator means, resetting said recording means to a base line prior to selection of the next size range, and
means coupled to said particle detecting orifice means, said particle detection control means, and said integrator means initiating their operation, terminating their operation prior to the selection of each size range and after the selection of all size ranges, and restarting their operation after selection of each next size range,
whereby said recording means provides discrete graphs for each particle size range, each discrete graph functionally related to the number of detected particles within each size range.

17. Apparatus as defined in claim 16 further comprising:
counting means coupled to said particle detector control means and said programming means and providing a progressive visual indication of the number of particles within the selected size range being detected.

18. Apparatus as defined in claim 17 wherein, said counting means comprises:
a pair of counters, and
said programming means further comprises, means alternately energizing each of said counters during successively selected size ranges, such that during detection of particles of any particular size range only one of said counters is energized,
means retaining the visually presented count in one counter while the other counter is being energized, and
means resetting said one counter prior to its next energization.

19. Apparatus as defined in claim 1 wherein, said programming means comprises:
means regulating the time during which particles within a predetermined size range are being detected and their number graphically recorded.

20. Apparatus as defined in claim 19, wherein, said time regulating means comprises:
incrementally advanceable means, and
timed energizing means coupled to said incrementally advanceable means for advancing it.

21. Apparatus as defined in claim 20 wherein, said timed energizing means is cyclic and defines a predetermined time interval, and
said time regulating means further comprising motive means coupled to said timed energizing means and providing cyclic movement thereto.

22. Apparatus as defined in claim 20 wherein, said incrementally advanceable means comprises:
presettable time control means determining the number of increments said advanceable means is advanced during the detection of particles within a predetermined size range, and
said time regulating means further comprises means resetting said incrementally advanceable means after it has advanced said number of increments.

23. Control means in a recording instrument to graph in succession, curves representing respective numbers of particles of different size ranges detected by apparatus in which the particles are passed through an orifice for varying a current through the orifice in accordance with the particle size to permit current variations of less than a desired amplitude to be rejected and current variations greater than another desired amplitude to also be rejected and those current variations lying between the two amplitudes to be registered, said control means, comprising; a switch, means connected to said switch for setting both said desired amplitudes at respective ones of a plurality of different values, and means for successively operating said switch to successively set said amplitudes at different values whereby said recording instrument is controlled in accordance with the current variations representing successive particle size ranges to provide said curves.

24. In the arrangement claimed in claim 23, means selectively operating said amplitude setting means for controlling said recording instrument in accordance with current variations representing any desired particle size range only.

25. Apparatus for recording a series of graphs each individual to particles of one of a plurality of respective size ranges which comprises, particle detecting apparatus which provides only one signal for each detected particle, said one signal having a characteristic corresponding to the size of its respective particle, means for selecting signals having a range of said characteristic corresponding to any one of a plurality of respective particle size ranges, means for operating said selecting means to successively select signals having the characteristic corresponding to each size range, and means respective to said successively selected signals for recording a graph corresponding to said successively selected signals for each size range.

References Cited

UNITED STATES PATENTS

| | | | |
|---|---|---|---|
| 2,494,441 | 1/1950 | Hillier | 235—92 |
| 2,704,633 | 3/1955 | Strother | 235—92 |
| 2,847,268 | 8/1958 | Cowper | 235—92 |
| 3,127,505 | 3/1964 | Gustavson | 235—92 |

MAYNARD R. WILBUR, *Primary Examiner.*

JOHN F. MILLER, G. J. MAIER, *Examiners.*